(12) United States Patent
Qureshi et al.

(10) Patent No.: US 7,836,132 B2
(45) Date of Patent: Nov. 16, 2010

(54) DELIVERY CONFIRMATION FOR E-MAIL

(75) Inventors: Imran I. Qureshi, Milpitas, CA (US); Thomas A. Leung, Seattle, WA (US); Pablo M. Stern, San Francisco, CA (US); William R. Hoffman, Mountain View, CA (US); Eliot C. Gillum, Mountain View, CA (US); Omar H. Shahine, San Francisco, CA (US); Michael D. Schackwitz, Bellevue, WA (US); Roberto F. Figueroa, Kirkland, WA (US); Vikram S. Sardesai, Sunnyvale, CA (US); Robin L. Boyea, Sunnyvale, CA (US); Charles R. Little, II, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 11/301,862

(22) Filed: Dec. 13, 2005

(65) Prior Publication Data

US 2007/0136430 A1    Jun. 14, 2007

(51) Int. Cl.
*G06F 15/16* (2006.01)
(52) U.S. Cl. .................................... 709/206
(58) Field of Classification Search ................ 709/204, 709/206
See application file for complete search history.

(56) References Cited

U.S. PATENT DOCUMENTS

| | | | |
|---|---|---|---|
| 6,332,164 B1 * | 12/2001 | Jain | 709/235 |
| 6,549,950 B2 * | 4/2003 | Lytle et al. | 709/246 |
| 2002/0032727 A1 | 3/2002 | Dias et al. | |
| 2002/0116508 A1 * | 8/2002 | Khan et al. | 709/229 |
| 2003/0078987 A1 * | 4/2003 | Serebrennikov | 709/217 |
| 2003/0225850 A1 | 12/2003 | Teague | |
| 2005/0015455 A1 * | 1/2005 | Liu | 709/207 |
| 2005/0210273 A1 * | 9/2005 | Gersten et al. | 713/189 |

(Continued)

OTHER PUBLICATIONS

"Delivery Receipts and Read Receipts in Outlook 2000," http://support.microsoft.com/kb/192929/en-us, Aug. 12, 2004.

(Continued)

*Primary Examiner*—Wing F Chan
*Assistant Examiner*—Andrew Woo
(74) *Attorney, Agent, or Firm*—Vierra Magen Marcus & DeNiro LLP

(57) ABSTRACT

A delivery confirmation is provided to the sender of an e-mail message. When the e-mail message is composed, a link, such as a hyperlink, is inserted into the e-mail message, such as in the body or header. The link can include information such as a message identifier and identifiers of the sender and the recipient, which are provided as a query string of the link, while a host field of the link includes the address of an e-mail/web server. When the recipient receives the e-mail message and opens it, the link is displayed along with text that instructs the user to use the link to confirm delivery. The confirmation can include displaying indicia for the e-mail message in a folder view on an interface of the sender, or sending a confirmation e-mail message to the sender, for instance. Voting by e-mail can also be provided.

18 Claims, 18 Drawing Sheets

U.S. PATENT DOCUMENTS

2005/0240617 A1 10/2005 Lund et al.
2006/0031359 A1 2/2006 Clegg et al.
2006/0173776 A1* 8/2006 Shalley et al. .................. 705/39

OTHER PUBLICATIONS

"Email Tracking—How are Web Beacons used within emails?" http://www.allaboutcookies.org/email/, printed Oct. 19, 2005.

* cited by examiner

Fig. 5

| Reply | Forward | Print | Delete |

From: Jim Sender  Sent: 10/10/05 9:05pm
To: Sue Sales
Subject: closing date  510

Jim Sender has requested a delivery confirmation. Please click one  520
of the links below or cut and paste URL into browser:
← 435

I received the e-mail ← 440
http://www.hotmail.com/mail/
deliveryconfirmation.aspx?action=receive&data =<encrypted_string> ← 445  430
I read the e-mail    ← 450
http://www.hotmail.com/mail/
deliveryconfirmation.aspx?action=read&data=<encrypted_string> ← 455

Hi Sue,

I need to close by the 30th. Is that acceptable to the sellers? Please let me know ASAP.

330

Jim

Fig. 7

| Folders: | Sent Items | | | |
|---|---|---|---|---|
| Inbox<br>Drafts<br>>Sent Messages<br>Junk Mail<br>Deleted | To: | Subject: | Sent: | Status: |
| | Sue Sales | closing date | 10/10/05 | Receive confirmed<br>10/11/05<br>at 10:32am |
| | Mom | vacation plans | 10/6/05 | Read confirmed<br>10/8/05<br>at 1:15pm |
| | Bob | how are you? | 10/2/05 | Awaiting confirmation |
| | Jones | Per your request... | 10/1/05 | Confirmation not requested |
| | Smith | New project | 9/30/05 | Confirmation<br>12 days overdue |

Toolbar: New, Print, Delete, Reply, Reply to all, Forward 700, 710, 720, 730

Fig. 8

| | | | | |
|---|---|---|---|---|
| Folders: | Sent Items | | | |
| Inbox<br>Drafts<br>Sent Messages<br>Junk Mail<br>Deleted<br>>Confirmation status | To: | Subject: | Sent: | Status: |
| | Sue Sales | closing date | 10/10/05 | Receive confirmed 10/11/05 at 10:32am |
| | Mom | vacation plans | 10/6/05 | Read confirmed 10/8/05 at 1:15pm |
| | Bob | how are you? | 10/2/05 | Awaiting confirmation |
| | Smith | New project | 9/30/05 | Confirmation 12 days overdue |

Buttons: New, Print, Delete, Reply, Reply to all, Forward, Re-send

Fig. 9

| Folders: 910 | Inbox 920 | | |
|---|---|---|---|
| >Inbox<br>Drafts<br>Sent Messages<br>Junk Mail<br>Deleted | From: | Subject: | Received: |
| | Hotmail | Successful Delivery | 10/11/05 |
| | Fred | Golf this weekend? | 10/8/05 |
| | Mom | Re: vacation plans | 10/7/05 |
| | newsline | weather bulletin | 10/6/05 |

Buttons: New, Print, Delete, Reply, Reply to all, Forward (900)

Fig. 14

| Send | Attachments | Print | Confirmation | >Voting |

To: Student body
Cc:
Subject: Campus voting today!

Attention students! This is your chance to select your campus leader. Cast your vote by selecting the candidate of your choice below:

Fig. 15

Voting Setup Screen

Number of choices: [2]

Names of choices:

Betty Boop

Jim Thorpe

Exit

| Reply | Forward | Print | Delete |

From: Campus administrator      Sent: 11/01/05 8:00am
To: Student body
Subject: Campus voting today!      <u>1410</u>

Attention students! This is your chance to select your campus leader. Cast your vote by selecting the candidate of your choice below:

← 1430

<u>Betty Boop</u> ← 1640
http://www.hotmail.com/mail/
votetally.aspx?action=bettyboop&data=<encrypted_string> ← 1645

<u>Jim Thorpe</u> ← 1650
http://www.hotmail.com/mail/
votetally.aspx?action=jimthorpe&data=<encrypted_string> ← 1655

Voting Tally Results

Choices:      Votes: ← 1710

| Betty Boop | 352 |
| Jim Thorpe | 188 |

1720      1730
Exit      Stop vote

Fig. 20

| Send | Attachments | Print | Confirmation | >Voting |

To: Student body
Cc:
Subject: School dance

Vote: Are you going to the school dance?

Yes ← 2040      No ← 2050

Hi everyone,

I'm organizing the school dance this year. Please let me know if you are attending by voting using the links above.

Thanks,
Jeff

DELIVERY CONFIRMATION FOR E-MAIL

BACKGROUND

Electronic mail, or e-mail, has become pervasive. For instance, e-mail has become mission-critical for many businesses in enabling employees to communicate. Generally, people are relying on e-mail more than ever. As a result, the consequences of a recipient not receiving an e-mail can be significant. There are a number of reasons why an e-mail may not be received and/or read by the designated recipient. For example, the e-mail may have been lost in transit due to a network or host failure. Or, an e-mail may be filtered out by a spam filter, which filters out so-called junk e-mail, at the sending side or at the receiving side. Moreover, different e-mail providers use different spam filters, and the filters are always evolving. Thus, an e-mail that may have been successfully received in the past may not be received in the future if re-sent. Further, an e-mail may not be read simply because the recipient did not check his or her e-mail inbox.

A solution is needed for providing receipts for e-mail messages in a flexible, user-friendly manner which is compatible across different e-mail systems, and which maintains the privacy of e-mail recipients.

SUMMARY

The technology herein, roughly described, provides a technique for providing a delivery confirmation for e-mail messages.

In one approach, the sender has the option of requesting a delivery confirmation when composing an e-mail. When a confirmation is requested, a link is inserted into the e-mail, such as in the body or header. The link, such as a hyperlink, can include a host name of an e-mail/web server and a query string which is developed based on identifiers of the e-mail message, the sender and/or the recipient. The query string is optionally encrypted. Additional text may be inserted in the body of the e-mail message for instructing the recipient to use the link to send a delivery confirmation. Furthermore, a plain text version of the link may be included as well in consideration of e-mail systems that do not support HTML. Once the sender has finished composing the message, the message is sent and delivered to the recipient's inbox.

When the recipient opens the e-mail message, the link and instructional text are displayed on the recipient's interface along with the remainder of the message which was composed by the sender. After reviewing the e-mail, or at any time desired by the recipient, the recipient can elect to use the link to send a confirmation to the sender. The recipient's privacy is maintained since the confirmation is electively sent. The user simply clicks the link with a mouse or other pointing device, for example, which causes a communication to be sent to an e-mail/web server specified by the host identifier in the link. The e-mail/web server can load a page in a web browser of the recipient to provide an acknowledgement to the recipient, and thank him or her for participating in the delivery confirmation service. Additionally, the web server recovers the information from the query string, including the identifiers of the e-mail message, sender and/or recipient, and uses this information to identify the associated sent message. The web server can then provide a confirmation to the sender in various ways. For example, the web server can provide a confirmation text or other indicia in a folder view of the sender, or communicate a confirmation e-mail to the sender.

Moreover, multiple links may be used in an analogous manner, where each link is associated with a different confirmation, such as a confirmation indicating that the e-mail message was received, but not necessarily read, or a confirmation indicating that the e-mail message was read.

In another aspect, voting by e-mail can be provided.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 5 illustrates a user interface of a recipient, showing a received e-mail message with the link and instructional text as provided in the composed e-mail message of FIG. 4.

FIG. 7 illustrates a user interface of a sender, showing messages in a sent messages folder with status information.

FIG. 8 illustrates a user interface of a sender, showing messages in a confirmation status folder with status information.

FIG. 9 illustrates a user interface of a sender, showing messages in an inbox, including a delivery confirmation e-mail message.

FIG. 14 illustrates a user interface of a sender, showing a composed e-mail message for initiating a vote.

FIG. 15 illustrates a voting setup screen which is invoked from the user interface of FIG. 14.

FIG. 16 illustrates a user interface of a sender, showing a composed e-mail message with links to vote choices inserted into the body of the e-mail message.

FIG. 17 illustrates a voting tally results screen.

FIG. 20 illustrates an alternative user interface of a sender, showing a composed e-mail message for initiating a vote.

DETAILED DESCRIPTION

E-mail programs allow users to compose, send, and receive messages over electronic communication systems. Internet based e-mail systems typically employ the Simple Mail Transfer Protocol (SMTP), while workgroup collaboration systems that are used within a company or other organization may use non-standard protocols, but have some form of gateway to allow them to send and receive Internet e-mail. Other organizations may use the Internet protocols for internal e-mail service. Additionally, web-based e-mail programs (webmail) are web applications that allow users to access e-mail using a web browser. Webmail is often offered by Internet Service Providers (ISPs) or Internet web mail services such as MSN Hotmail®. Further, an e-mail client, or mail user agent, is a computer program that is used to read and send e-mail messages. Protocols used by e-mail clients for retrieving e-mail messages from mail servers include the Internet Message Access Protocol (IMAP) and Post Office Protocol 3 (POP3). IMAP4 is optimized for storage of e-mail on the server, while POP3 generally assumes that the e-mail is downloaded to the client.

Figure 1:
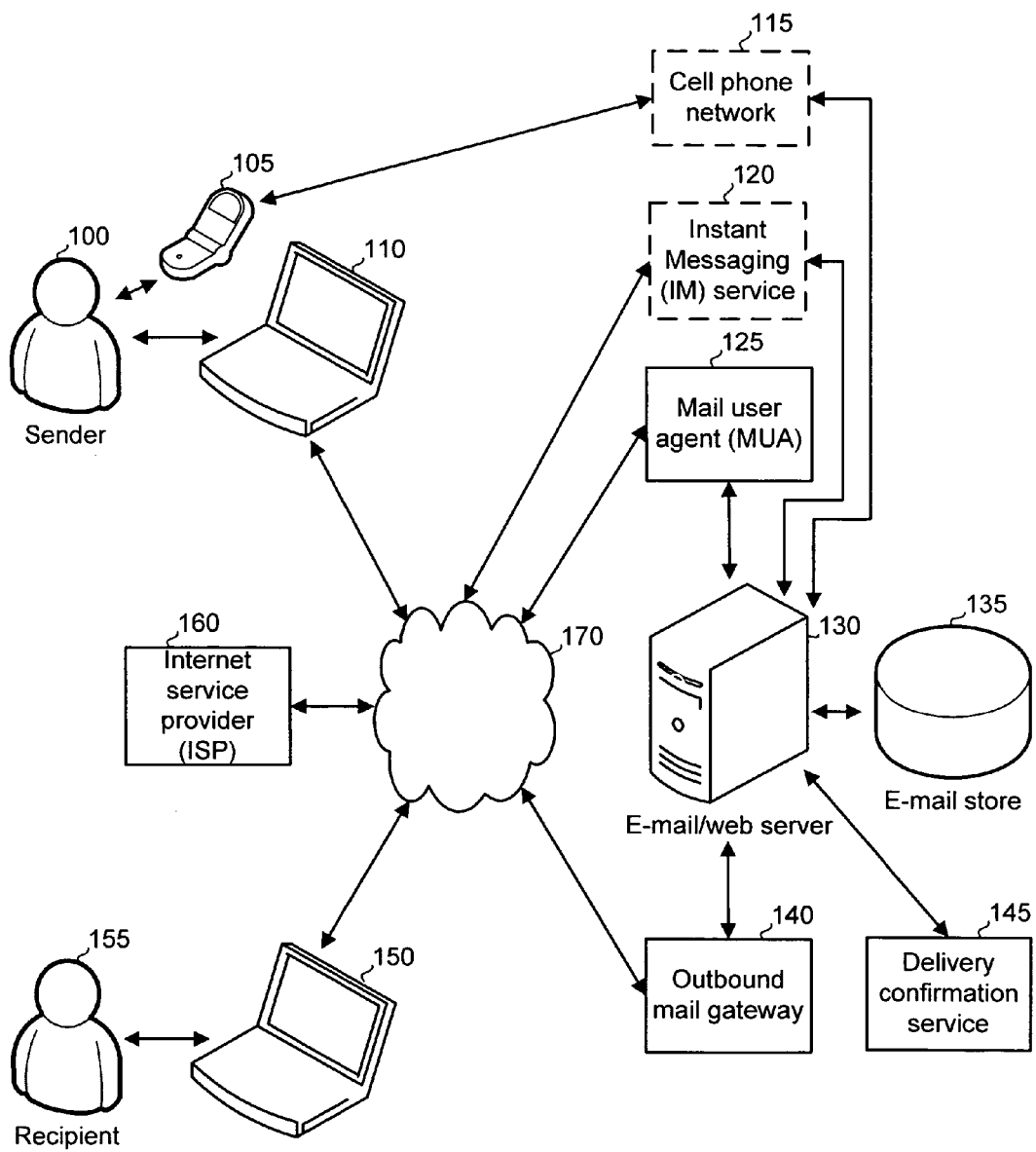
FIG. 1 illustrates a network topology for providing an e-mail message confirmation to a sender.

FIG. 1 illustrates a network topology for providing an e-mail message confirmation to a sender. In the example provided, a sending user or sender 100 prepares an e-mail message using an e-mail client on a host computer 110 and sends the message to a receiving user or recipient 155, who uses an e-mail client on a host computer 150 to receive the message. In particular, the host computer 110 can send the message to a mail user agent (MUA) 125 which, in turn, forwards the message to an e-mail/web server 130. The e-mail/web server 130 communicates with an e-mail store 135 for storing and accessing e-mail messages, in one possible approach. To deliver the e-mail message, the e-mail/web server 130 forwards the message to an outbound mail gateway 140 which, in turn, forwards the message to the host computer 150 so that it can be read by the recipient 155. The host computers 110 and 150 may optionally access the e-mail/web server via an Internet Service Provider (ISP) 160. Furthermore, a network cloud 170, such as the Internet or other wide area network (WAN), or other network such as a local area network (LAN), may connect the various components as shown. The host computers 110 and 150 can be workstations, laptop computers, PDAs, pagers, cell phones, or other mobile devices, for instance.

A delivery confirmation service 145, whose functionality is detailed further below, and which is associated with or incorporated into the e-mail/web server 130, allows the recipient 155 to provide a delivery confirmation for a received e-mail message to the sender 100. Optionally, the functionality of the delivery confirmation service 145 can be provided at the sender's host machine 110, which pulls code from the e-mail/web server 130 as needed.

In another option, the e-mail/web server 130 can communicate with an Instant Messaging (IM) service 120 to allow the recipient 155 to provide a delivery confirmation for a received e-mail message to the sender 100 via an instant messaging application on the host computer 110. In a further option, the e-mail/web server 130 can communicate with a cell phone network 115 to allow the recipient 155 to provide a delivery confirmation for a received e-mail message to the sender 100 via a text messaging application on a cell phone 105. For example, the Short Message Service (SMS), which is a service for sending short text messages to mobile phones, may be used. The delivery confirmation could also be provided via a smart notification or routing system combining email, IM and SMS, for instance. In such an approach, a confirmation could be sent via IM if the user is logged in to the IM system and it is detected that the user has been active recently in sending or receiving messages. Otherwise, the confirmation could be sent via email if the user has been active recently in sending or receiving emails. Or, a confirmation could be sent via multiple techniques at the same time, e.g., via IM, email and/or SMS, such as when the e-mail message has a high priority level.

Figure 2:
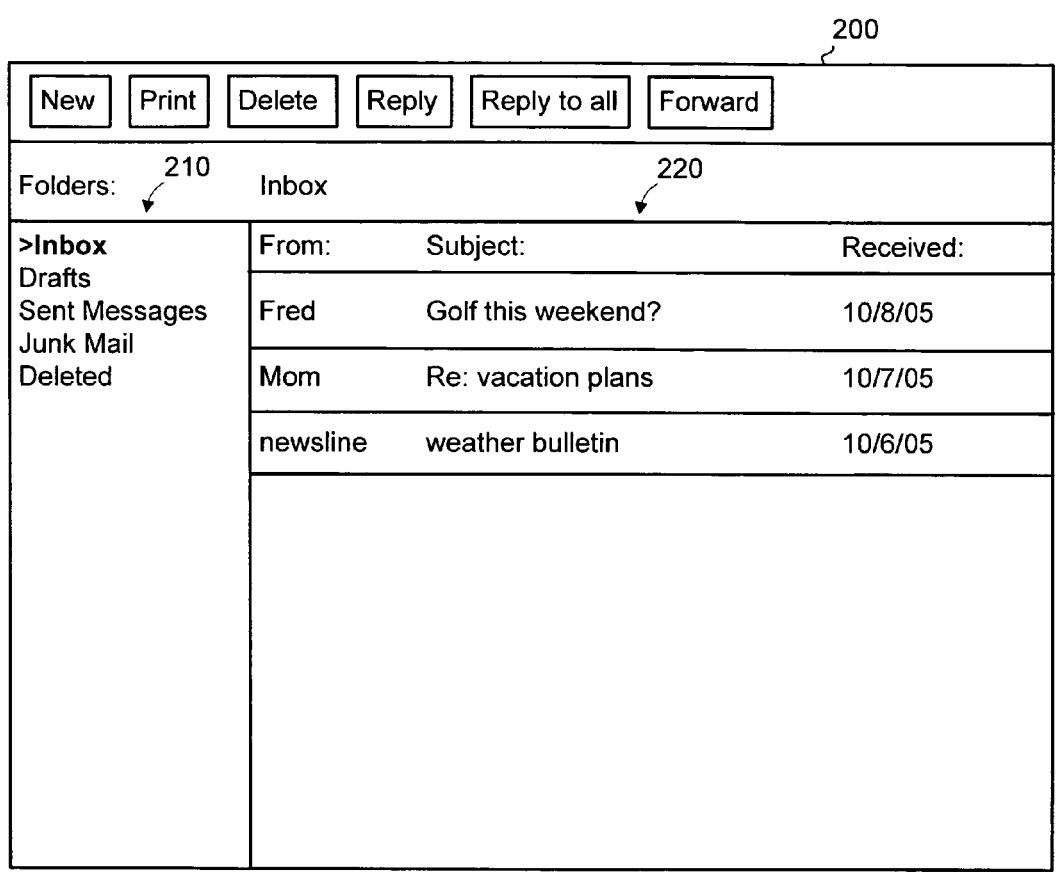
FIG. 2 illustrates a user interface of a sender, showing messages in an inbox.

FIG. 2 illustrates a user interface of a sender, showing messages in an inbox. In the example shown, an interface 200 includes a display region 210 which lists the names of different folders, such as an "inbox" folder in which received messages are kept, a "drafts" folder in which draft messages are kept, a "junk mail" folder in which junk mail or spam is kept, and a "deleted" items folder in which deleted messages are kept. When the user selects one of the folders, such as by using a mouse or other pointing device, the corresponding messages are displayed in a display region 220. In the current view, the inbox folder has been selected, and the display region 220 provides information relating to three example messages in that folder. A "From:" heading indicates the sender of the e-mail, a "Subject:" heading indicates a subject of the message, and a "Received:" heading indicates the date the e-mail was received by the e-mail system. Various buttons may be provided at the top of the interface 200 as indicated for managing e-mail messages. In particular, the "new" button allows the user to compose a new e-mail message. The interface 300 of FIG. 3 is opened when this button is selected.

Note that the interfaces provided herein are examples only and that other interface designs may be used. For example, some interfaces provide a preview pane that allows the user to view a portion of a message, and to select a link in a message, for instance, without fully opening the message. Some interfaces also allow the user to manually configure the display by navigating dialogs and by re-sizing display windows. Microsoft Outlook® is an example of an e-mail system with these features.

Figure 3:
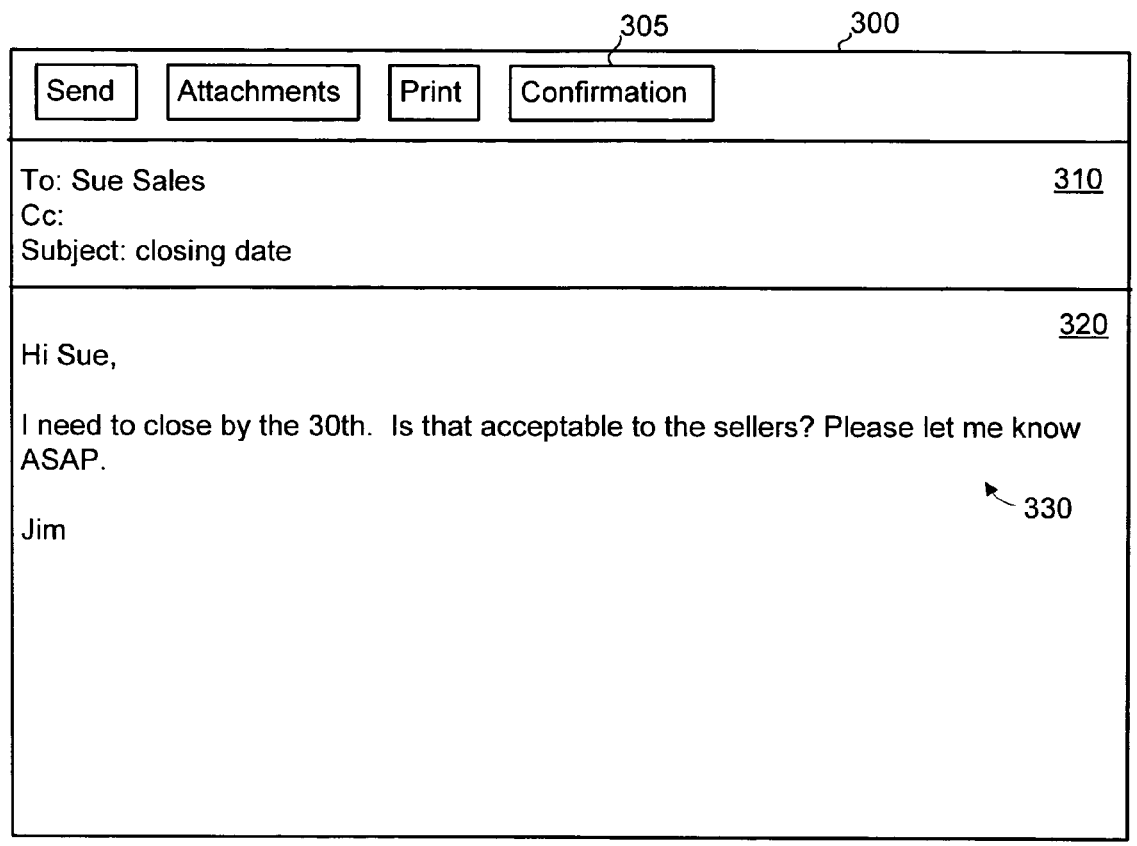
FIG. 3 illustrates a user interface of a sender, showing a composed e-mail message.

FIG. 3 illustrates a user interface of a sender, showing a composed e-mail message. The interface 300 displays a header 310 and a body 320 of an e-mail message which is being composed. The header 310 includes a "To:" field and a "Cc:" field in which the sender provides the e-mail address of one or more recipients, and a "Subject:" field in which the sender optionally provides a subject of the e-mail message, e.g., "closing date". The header information is considered to be meta data of the message. In the body 320, the sender types in the desired text 330 of the message. Graphics and other elements may be provided as well. Furthermore, the sender may include attachments with the message. Consider an example where the sender, "Jim Sender" composes an e-mail message to ask a real estate salesperson, Sue Sales, whether a certain closing date is acceptable to the sellers. Assume also that "Jim Sender" and "Sue Sales" are shorthand identifiers for e-mail addresses jimsender@hotmail.com and suesales@yahoo.com, respectively. The sender believes that the e-mail message is relatively urgent and desires to receive a confirmation from the recipient.

Accordingly, the sender selects a "confirmation" button 305, for instance, from the user interface 300 to request a delivery confirmation for the message. Various other techniques can be provided for invoking a request for a delivery confirmation, such as a graphical icon, voice interface and so forth. The sender can thereby provide a command for an individual message that is being composed indicating that a delivery confirmation is desired. Or, the e-mail client can be configured to automatically provide a delivery confirmation for all e-mail messages, or for e-mail messages meeting specified criteria, such as those addressed to a specified recipient or domain. Once the confirmation button 305 is selected, one or more links with instructional text is inserted into the body of the existing e-mail message which is being composed, as indicated by the interface 400 of FIG. 4.

Figure 4:
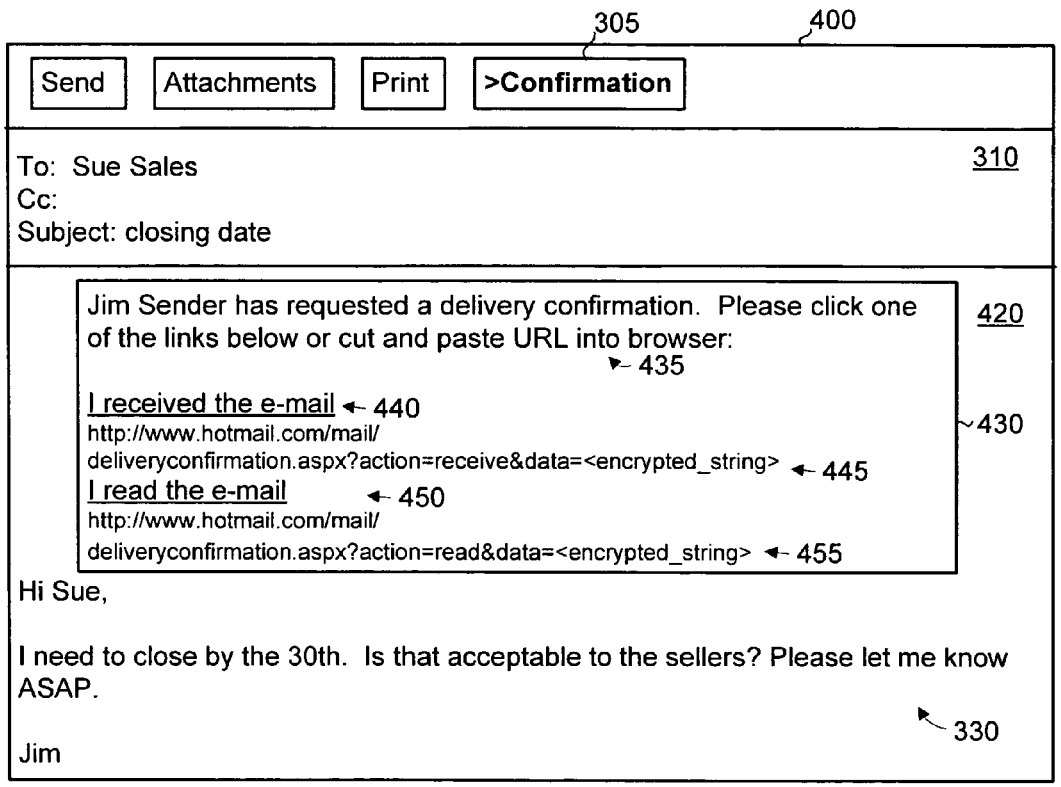
FIG. 4 illustrates a user interface of a sender, showing a composed e-mail message with a link and instructional text inserted into the body of the e-mail message.

FIG. 4 illustrates a user interface of a sender, showing a composed e-mail message with an insert 430, which includes one or more links and instructional text, which is inserted into the body 420 of the e-mail message. In the interface 400, the confirmation button 305 is highlighted, indicating that this command has been selected. When a delivery confirmation is requested, the delivery confirmation service 145 of the e-mail/web server 130 uses identifying information associated with the e-mail message to derive a link with a query string, and inserts this link with instructional text into the body 420 of the e-mail message.

In particular, one or more identifiers associated with the e-mail message are processed by the e-mail/web server to derive one or more links which are inserted into the body 420 of the e-mail message. The example insert 430 includes instructional text 435 for instructing the recipient in how to respond, a first link 440 for a first delivery confirmation, plain text 445 of the first link 440, a second link 450 for a second delivery confirmation, and plain text 455 of the second link 450. The instructional text 435 instructs the recipient to click on one of the links 440 or 450 if they are active. Or, the recipient should paste one of the plain text URLs 445 or 455 into the address field of a web browser when the recipient's e-mail client does not display e-mail messages in an HTML format or other format that supports active links such as hyperlinks. The plain text need not be included if it is known that that recipient's e-mail client supports active links such as provided by HTML. In this case, the instructional text 435 could read "Jim Sender has requested a delivery confirmation. Please click one of the links below." On the other hand, if the client doesn't render HTML, a different message can be rendered which is tailored to the text format which is rendered. For example, a text format having no links can be used. In this case, the instructional text 435 could read "Jim Sender has requested a delivery confirmation. Please cut and paste one of the URLs below into your browser."

Note that in the example provided, there are two links. Generally, one or more links may be used. The links include default text such as "I received the e-mail" and "I read the e-mail". The default text may be editable by the sender to allow the sender to customize the link. For example, assume the sender desires to contact some friends to invite them to a party. The sender therefore wishes to know if the friends can attend, e.g., by polling them. The sender may therefore modify the links to read "I will attend" and "Sorry, I cannot attend", or, "I will attend and bring drinks", "I will attend and bring food" and "Sorry, I cannot attend". Furthermore, in a business office, the links may read "I will consider this", "See me in person about this" and so forth. The links can be modified by simply editing the text of the link using the word processing facility of the e-mail client. Optionally, the sender can be provided with a wizard for editing the text instead of manually changing the text with a word processor. This approach provides a web experience which does not require a word processor, and addresses the fact that editing of links/content directly is prone to human error. In another approach, blank spaces are provided for the links and the sender is prompted to type in text. The instructional text 435 may similarly be modified by the sender. The sender can further request that the changes be saved and used for subsequent delivery confirmation requests.

Further, instead of having one confirmation button 305 which causes two links to be inserted into the e-mail message, it is possible to have multiple confirmation buttons for different types of links, e.g., one button for "I received the e-mail" and another button for "I read the e-mail". Or, a drop down list or other mechanism may be used to allow the sender to insert a specified type of link into an e-mail message.

The insert 430 can be provided in the body 420 of the e-mail message using known techniques for inserting text into a file. Furthermore, although the insert 430 is at the top of the body 420 in the example interface 400, it can be provided at the bottom, side or other location. Moreover, the insert need not be provided in a separate box, but can be integrated into the body 420 of the e-mail message with the message text 330. Note also that graphical elements can be used to provide the links.

Regarding the creation of a link, in one possible approach, one or more message, sender and/or recipient identifiers are used. The technique is facilitated since the identifiers used are already available at the e-mail/web server. The message identifier can be any type of identifier that the e-mail/web server creates for a newly composed e-mail message. For example, RFC 2822 Internet Message Format, The Internet Society, April 2001, provides guidelines for creating a message identifier. RFC 2822 notes that the message identifier should be globally unique. Furthermore, the message identifier is intended to be machine readable and not necessarily meaningful to humans. A message identifier should pertain to one instantiation of a particular message. In one possible algorithm, the message identifier includes the domain name (or a domain literal IP address) of the host on which the message identifier was created, and a combination of the current absolute date and time along with some other currently unique (perhaps sequential) identifier available on the system, such as a process id number. The message identifier is included in the header of an e-mail message. The sender and recipient identifiers in the link may be their respective e-mail addresses, for instance.

The following example query string is developed using the sender, recipient (recip) and message identifiers (msgid):

Sender=<jimsender@hotmail.com>&recip=<suesales@yahoo.com>&msgid={121234334-21132-12321312-12323211}

The e-mail/web server can optionally encrypt the string and include it in the link. For example, the link 440 has the form:

"I received the e-mail"=http://www.hotmail.com/mail/deliveryconfirmation.aspx?action=receive & data=<encrypted_string>.

The link 450 has the form:

"I read the e-mail"=http://www.hotmail.com/mail/deliveryconfirmation.aspx?action=read&data=<encrypted_string>.

In this example, the links are hyperlinks with query strings. In the first example, "http" is the protocol, "www.hotmail.com" is the host e-mail/web server, "mail/deliveryconfirmation.aspx" is the resource path, and "?action=receive&data=<encrypted_string>" is the query string, which denotes a "receive" confirmation. The second example uses a different query string: "?action=read&data=<encrypted_string>", which denotes a "read" confirmation. In both cases, "<encrypted_string>" represents the encrypted query string. The action may also be encrypted.

FIG. 5 illustrates a user interface of a recipient, showing a received e-mail message with the link and instructional text as provided in the composed e-mail message of FIG. 4. Specifically, interface 500 represents the e-mail message received by the recipient. The header 510 identifies the sender in the "From:" field, the recipient in the "To:" field and the subject in the "Subject:" field. Additionally, the date and time that the message was sent are indicated in the "Sent:" field. In the body 520 of the message, the insert 530 generally appears the same as it did on the sender's e-mail client with the message text 330. The recipient can view the message by opening it or by using a preview pane, for example. After reviewing the instructional text, the recipient can proceed to use one of the links to send a delivery confirmation to the sender. For example, the recipient may select the link 440 if she wishes to indicate that she has received the message but has not had time to read and consider it carefully, or the link 450 if she wishes to indicate that she has received and read the message. If the recipient's e-mail client supports active links, the recipient simply clicks on one of the links to send a confirmation. Otherwise, the recipient can cut and paste the plain text of the link into the address field of a web browser.

When a link is selected, the corresponding URL and query string are sent in a communication from the recipient's e-mail client to the e-mail/web server. At the e-mail/web server, the query string is decrypted to recover the one or more identifiers associated with the e-mail message. This allows the e-mail/web server to identify the sent message in the sent messages folder of the sender, for instance, in the e-mail store. In one approach, the message identifier in the query string is sufficient to identify the sent message. In another approach, the sent message is located using both the message and sender identifiers. In yet another approach, all three identifiers are used. Essentially, the sent messages of the different users of an e-mail system can be stored in the e-mail store indexed by one or more identifiers which can be provided in the query string.

Note that using a link which is contained in the body of an e-mail message to provide a confirmation is advantageous as there is no need for special software on the recipient's e-mail client. When the recipient uses one of the links to send a confirmation, the interface of FIG. 6 is loaded into the recipient's web browser.

Figure 6:
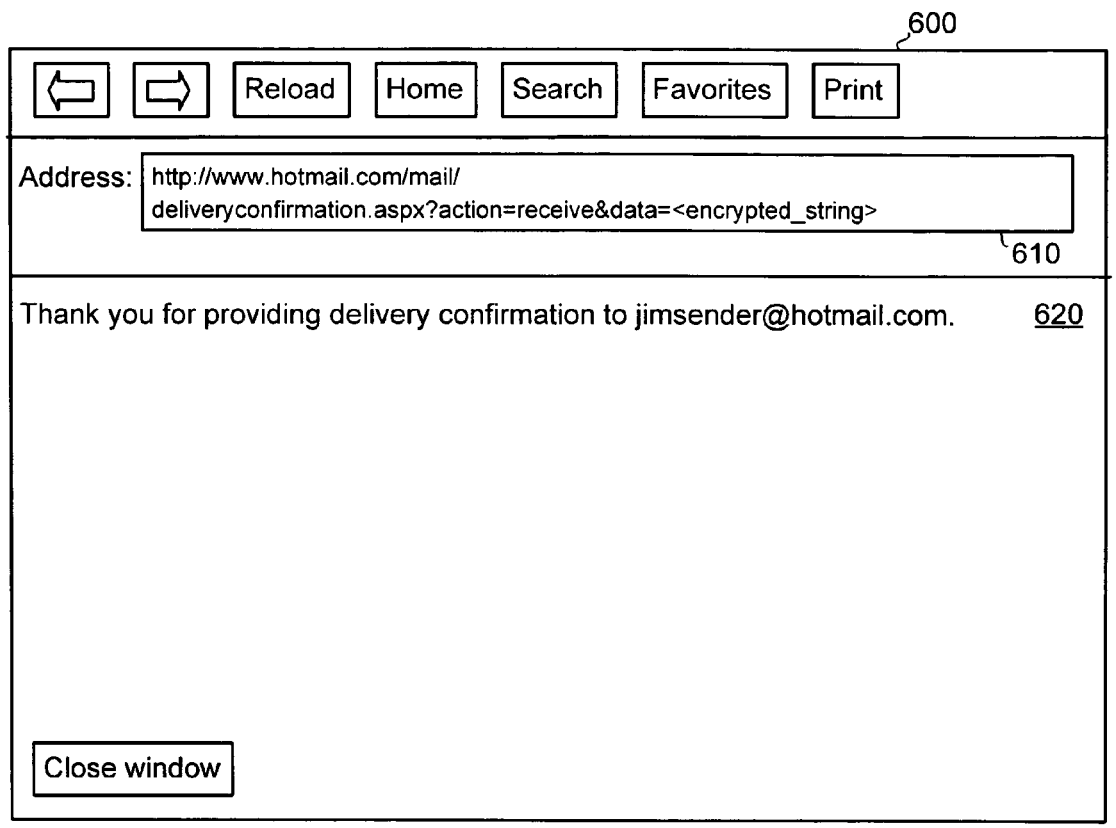
FIG. 6 illustrates a web page on a web browser of a recipient acknowledging the recipient's use of the link as provided in the received e-mail message of FIG. 5.

FIG. 6 illustrates a web page on a web browser of a recipient acknowledging the recipient's use of the link as provided in the received e-mail message of FIG. 5. The interface 600 includes an address field 610 in which the link is displayed. A corresponding display area 620 includes a message that acknowledges the recipient's participation in the delivery confirmation service. The display area 620 may include a standard message such as "Thank you for providing delivery confirmation." Or, in the example shown, the message further includes a reference to the sender. The identity of the sender, such as the e-mail address, which is recovered from the query string of the link, as discussed, can be used for this purpose. The web page may include further information regarding the delivery confirmation feature, advertisements or the like to maintain the recipient's attention.

Once a link has been used, measures may be taken by the e-mail/web server to invalidate the link so it cannot be used again. This prevents replay attacks. If the recipient clicks on the link again, an appropriate message can be displayed, e.g., in a web page, informing the recipient that a delivery confirmation has already been made.

FIG. 7 illustrates a user interface of a sender, showing messages in a sent messages folder with status information. In the example provided, an interface 700 includes a display region 710 which lists the names of different folders. In the current view, the sent messages folder has been selected, and the display region 720 provides information relating to example messages in that folder in a folder view. Headings in the display region 720 indicate the sender of the e-mail, the subject, and the date the e-mail was sent. Further indicia in a display region 730 provide a status for the sent messages. In particular, this region can provide information regarding whether a delivery confirmation was requested or received. For the first message, which is the example message of FIG. 5 sent to "Sue Sales", the display region 730 indicates that a "receive confirmation" was received, and the date and time it was received, based on the confirmation provided by the recipient. The date and time can be noted by the e-mail/web server when the link is loaded. This indicates that the recipient selected the link entitled "I received the e-mail" at the specified date and time. The information in the display region 730 is provided by the e-mail/web server by identifying the specific sent message in the sent messages folder using the one or more identifiers provided in the link, as discussed previously.

In a second example e-mail message sent to "Mom", the display region 730 indicates that a "read confirmation" was received, and the date and time it was received. In a third example e-mail message sent to "Bob", the display region 730 indicates that the message was "awaiting confirmation". Thus, a delivery confirmation was requested by the sender when the e-mail message was sent, but no confirmation has yet been received. In a fourth example e-mail message sent to "Jones", the display region 730 indicates that a "confirmation was not requested".

In a fifth example e-mail message sent to "Smith", the display region 730 indicates that a confirmation is "12 days overdue". In this case, the sender is notified of an overdue delivery confirmation. For example, when an e-mail message with a delivery confirmation is sent, a timer can start to run at the e-mail/web server so that an elapsed time since the e-mail message was sent is available. If the timer reaches a user-configurable value, e.g., one day or one week, without receiving the confirmation, the sender is notified. If the delivery confirmation is received before the timer reaches the value, the timer is zeroed. In another approach, a calendar feature associated with the e-mail client can automatically log a reminder for a specified user-configurable period, or based on a specified date and time. If the delivery confirmation is received before the specified date and time, the reminder is deleted from the calendar. However, if the delivery confirmation is not received before the reminder date and time, the sender is notified. The notification can be in the form of indicia in a sent messages folder, as indicated in FIG. 7, or other folder view, or a separate e-mail notification, for instance.

The interface 700 provided is an example only as various other techniques may be used for relaying a confirmation to a sender. For example, graphical elements may be used, such as by providing different icons or color coding to indicate the different possible statuses. The confirmation can be provided by displaying any type of indicia for the e-mail message in a sent messages folder on an interface of the sender or elsewhere.

FIG. 8 illustrates a user interface 800 of a sender, showing messages in a confirmation status folder with status information. A confirmation status view could also be provided that just contains a list of all e-mail messages that were sent with a delivery confirmation request. The view can be updated on an ongoing basis for tracking past and current e-mails with delivery confirmation requests. In the example provided, an interface 800 includes a display region 810 which lists the names of different folders. In the current view, the confirmation status folder has been selected, and the display region 820 provides information relating to example messages in that folder in a folder view. Headings in the display region 820 indicate the sender of the e-mail, the subject, and the date the e-mail was sent. Further indicia in a display region 830 provide a status for the sent messages. The messages displayed in this view include each of the messages in the interface 700 of FIG. 7 for which a delivery confirmation was requested. This includes each of the messages in the interface 700 except the message sent to "Jones". In another option, separate folders can be provided for the e-mail messages for which a delivery confirmation was requested, such as a folder for messages for which a confirmation has been received, a folder for messages for which a confirmation is pending, a folder for messages for which a confirmation is overdue, and so forth. Furthermore, the messages in the different categories can be provided in a single view arranged in different sections on the interface 800.

Additionally, a "re-send" button 805 provides the user with a "re-send" option for re-sending an e-mail message if a delivery confirmation is not received within a specified time period or by a specified date/time. For example, the user may wish to re-send the e-mail message to "Smith" since a confirmation is twelve days overdue. In one possible approach, the user can select the e-mail message, then select the "re-send" button 805. This causes appropriate software to be executed at the sender's host 110 (FIG. 1) and/or the e-mail/web server 130, for instance, for re-sending the e-mail message to the specified recipient. Re-sending a message can involve creating a new e-mail message using information from the previously sent message. For example, the e-mail/web server 130 may retrieve the sent message from the e-mail store 135 and generate a new e-mail message using information such as the sender and recipient identifiers. A new message identifier can be created as is done normally for new messages. The text of the new message can also be copied from the retrieved message to the new message. A new link can be developed based on the new message identifier and the retrieved sender and recipient identifiers. Similarly, a new insert such as the insert 430 (FIG. 4) can be provided using the new link with the retrieved link text and instructional text. The newly created message can then be sent to the recipient. The re-sent message can be tracked using the interface 700 or 800, for instance. The re-sent message can appear as a separate message in the interface 700 or 800, or indicia can be provided indicating that the earlier sent message was re-sent. Note that a message can be manually re-sent by the sender or automatically re-sent such as discussed below in connection with FIG. 13.

FIG. 9 illustrates a user interface of a sender, showing messages in an inbox, including a delivery confirmation e-mail message. In the example shown, an interface 900 includes a display region 910 which lists the names of different folders. In the current view, the inbox folder has been selected, and the display region 920 provides information relating to four example messages in that folder. Headings in the display region 920 are provided as discussed previously. The region 920 indicates that a delivery confirmation e-mail message has been received from the e-mail/web server, which is identified by the name "Hotmail", referring to MSN Hotmail® as an example only. The e-mail/web server can generate such an e-mail message when a recipient uses a link in a received e-mail message. When the information in the link is received by the e-mail/web server, including the identity of the particular sent message and the sender, the e-mail can be generated. The interface of FIG. 10 appears when the first message is opened or viewed in a preview pane, for instance.

Figure 10:
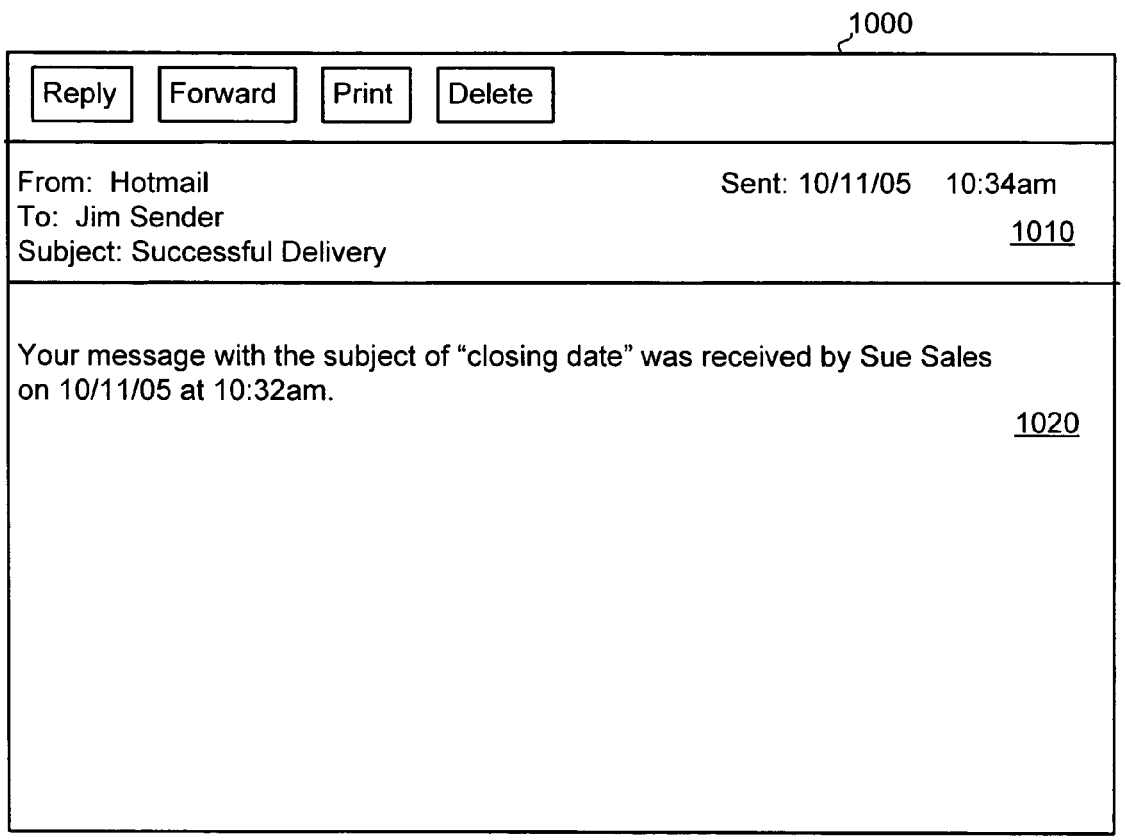
FIG. 10 illustrates a user interface of a sender, showing a received delivery confirmation e-mail message.

FIG. 10 illustrates a user interface of a sender, showing a received delivery confirmation e-mail message. Interface 1000 represents the confirmation e-mail message received by the sender from the e-mail/web server. The header 1010 identifies the sender in the "From:" field, the recipient in the "To:" field and the subject in the "Subject:" field. Additionally, the date and time that the message was sent are indicated in the "Sent:" field. The body 1020 of the message informs the sender, Jim Sender, that the message with the subject of "closing date" was received by the recipient "Sue Sales" on the specified date and time. That is, the recipient provided a receive confirmation on the specified date and time. Note that the subject of the e-mail can be recovered from the sent message in the e-mail store. In another approach, the subject is recovered from the link. Another option is to create a separate folder for all delivery receipts.

Furthermore, it is possible for the e-mail/web server to aggregate the confirmations received from multiple recipients and provide one confirmation e-mail which indicates the recipients that have confirmed delivery, as well as the recipients that have not yet confirmed delivery. For example, such a confirmation e-mail may state: "Your message with the subject of "closing date" was received by Sue Sales on Oct. 11, 2005 at 10:32 am, and by bob@yahoo.com on Oct. 11, 2005 at 11:30 am".

Moreover, options outside of the e-mail context can also be used for confirming delivery of an e-mail message. For example, as mentioned in connection with FIG. 1, the e-mail/web server 130 can communicate with a cell phone network 115 to allow the recipient 155 to provide a delivery confirmation for a received e-mail message to the sender 100 via a text messaging application on a cell phone 105. Typically, the cell phone or other mobile device has its own e-mail address that allows it to receive SMS messages of up to 100-300 characters. Longer messages can be broken up. Or, the e-mail/web server 130 can communicate with an Instant Messaging (IM) service 120 to allow the recipient 155 to provide a delivery confirmation for a received e-mail message to the sender 100 via an instant messaging application on the host computer 110. Thus, a confirmation e-mail or other message can be sent to different hosts that are specified by the sender.

Figure 11:
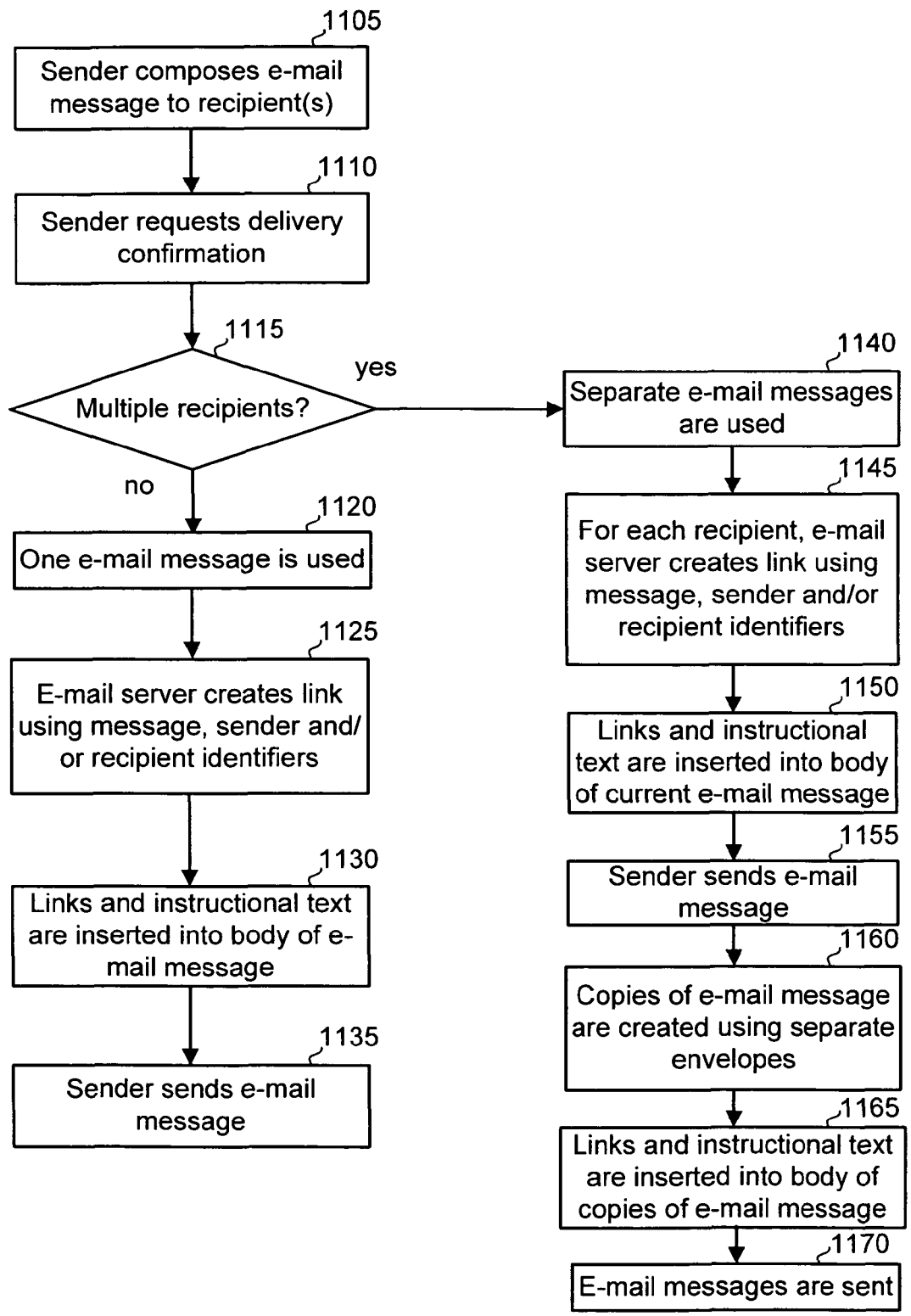
FIG. 11 illustrates a method for sending an e-mail message that enables a delivery confirmation.

FIG. 11 illustrates a method for sending an e-mail message that enables a delivery confirmation. At step 1105, the sender composes an e-mail message to one or more recipients. At step 1110, the sender requests a delivery confirmation for the e-mail message, or, a delivery confirmation is automatically provided. At decision block 1115, a determination is made as to whether there are multiple recipients. The e-mail server can determine this by counting the number of recipients in the "To:", "Cc:" and "Bcc:" fields in the composed e-mail. If there is only one recipient, one e-mail message is used, at step 1120. The e-mail/web server creates a link, including a query string, using one or more of the message, sender and/or recipient identifier (step 1125). At step 1130, the link or links and instructional text are inserted into the body of the e-mail message so that the sender can view how the e-mail message will appear to the recipient. See FIG. 4. Finally, at step 1135, the sender sends the e-mail message, such as by clicking on a "send" button, and the e-mail server initiates transmission of the e-mail message to the recipient.

At decision block 1115, if there are multiple recipients, separate e-mail messages are used for each recipient (step 1140). Generally, e-mail messages can be viewed as having an envelope and contents. The envelope contains the information needed to accomplish transmission and delivery, while the contents comprise the object to be delivered to the recipient. See the above-mentioned RFC2821 for further information. Thus, separate copies of an e-mail message can be created by using a different envelope for each recipient. In particular, at step 1145, the e-mail/web server creates a different link for each recipient using one or more of the message, sender and/or recipient identifiers, where the recipient identifier is for a specific recipient. At step 1150, the link or links and instructional text are inserted into the body of the current e-mail message which is displayed on the sender's interface. At step 1155, the sender sends the e-mail message, such as by clicking on a "send" button. At this time, at step 1160, copies of the e-mail message are created using separate envelopes. At step 1165, links and instructional text are inserted into the copies of the e-mail messages. In one approach, a separate link is used for each recipient, where the link includes the identifier of the recipient. At step 1170, the e-mail messages are finally sent out over the communication network. Each recipient can then send a confirmation from the respective received e-mail as if the recipient was the sole recipient.

Figure 12:
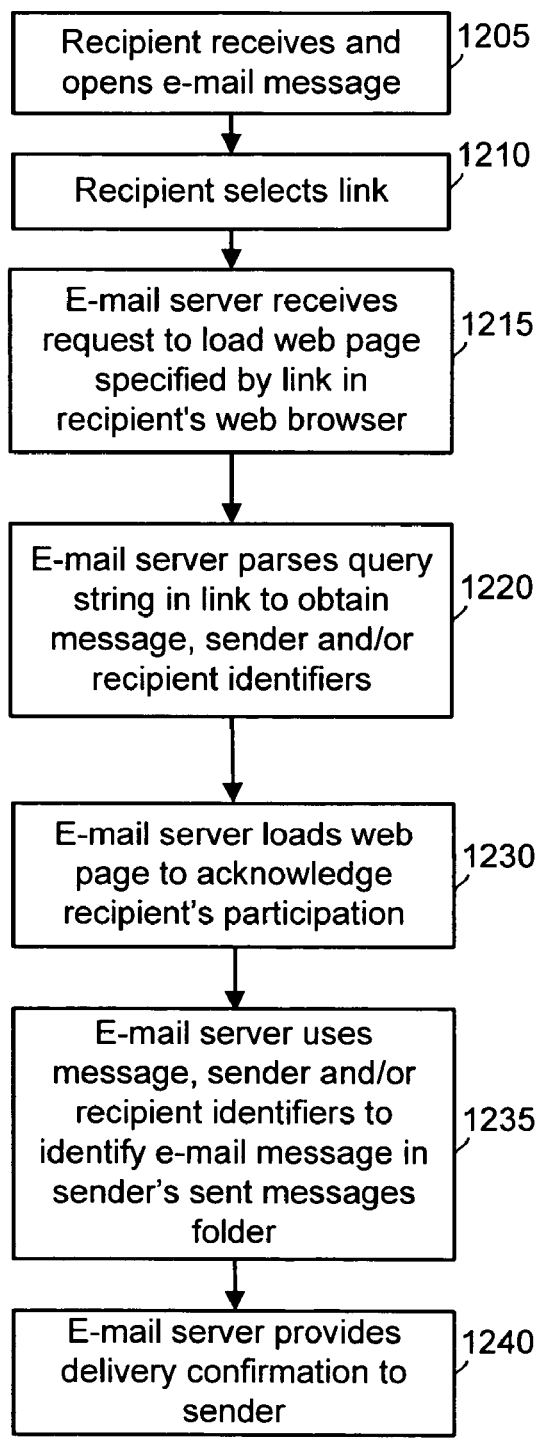
FIG. 12 illustrates a method for providing a delivery confirmation for a received e-mail message.

FIG. 12 illustrates a method for providing a delivery confirmation for a received e-mail message. At step 1205, the recipient receives and opens an e-mail message which was sent using the method of FIG. 11, for instance. At step 1210, the recipient selects a link in the message, which results in the e-mail/web server receiving a request to load a web page, specified by the link, in the recipient's web browser (step 1215). At step 1220, the e-mail/web server parses the query string in the link to obtain one or more of the message, sender and recipient identifiers. The e-mail/web server loads a web page in the recipient's web browser to acknowledge the recipient's participation by selecting the link (step 1230), and uses the message, sender and/or recipient identifiers to identify the e-mail message in the sender's sent messages folder (step 1235). Finally, at step 1240, the e-mail/web server provides a delivery confirmation to the sender, e.g., as discussed in connection with FIGS. 8-10.

Optionally, the delivery confirmation technique discussed above can be augmented with other data for providing automated or manual confirmations. For example, custom tags or other meta data can be added to the header of the e-mail message for instructing a client host to provide a confirmation, e.g., "I received the e-mail"=http://www.hotmail.com/mail/deliveryconfirmation.aspx?action=receive & data=<encrypted_string>&noUI=true. This meta data could invoke a custom client UI that allowed the user to provide a confirmation. In another approach, an XML payload can be embedded in the message as a custom MIME part, for instance, according to RFC3798. RFC3798 relates to a content-type that may be used by a mail user agent (MUA) or electronic mail gateway to report the disposition of a message after it has been successfully delivered to a recipient.

Figure 13:
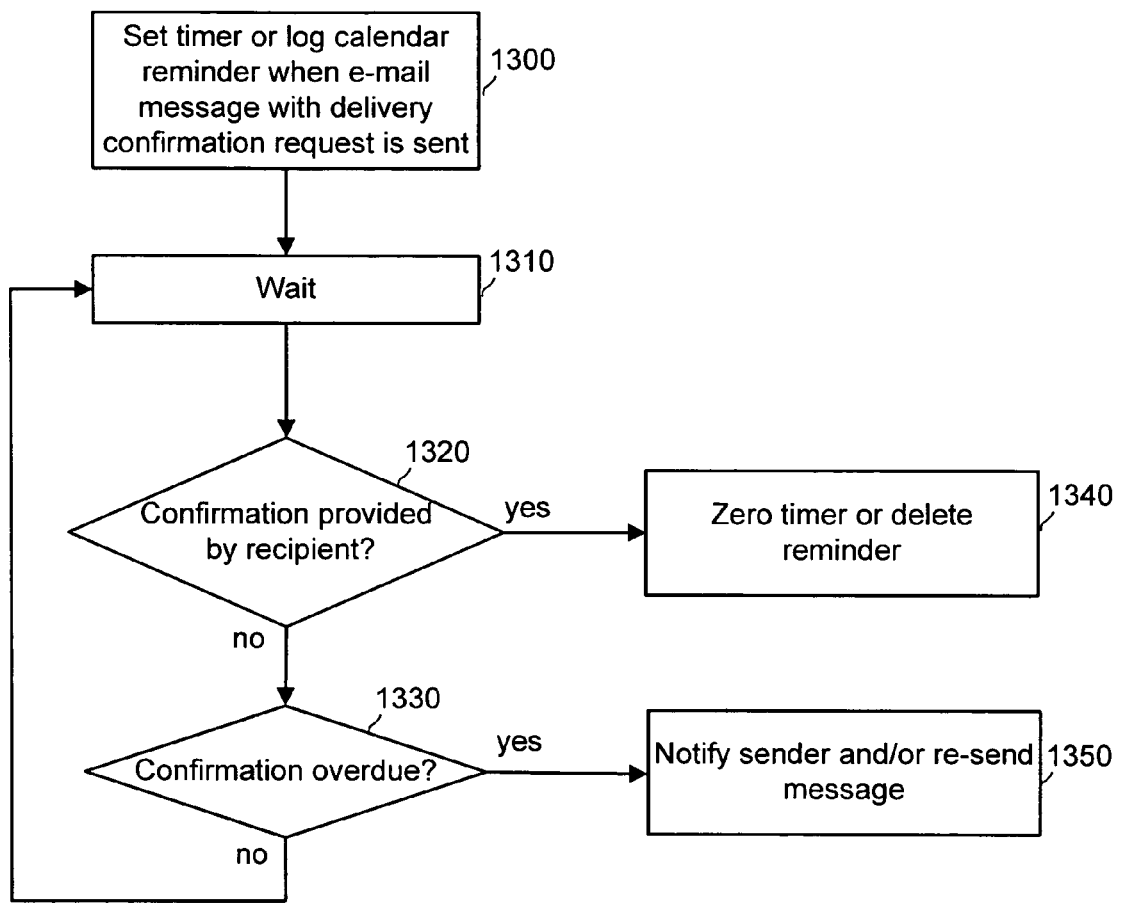
FIG. 13 illustrates a method for providing an overdue delivery confirmation notification for a sent e-mail message.

FIG. 13 illustrates a method for providing an overdue delivery confirmation notification for a sent e-mail message. As mentioned, the e-mail/web server can provide a notification to a sender of an overdue delivery confirmation. At step 1300, a timer is set or an electronic calendar reminder is logged, for instance, when an e-mail message with a delivery confirmation request is sent. At step 1310, a wait period is implemented, such as a few seconds, minutes or hours. At decision block 1320, if a confirmation is provided by the recipient, the timer is zeroed or the reminder is deleted (step 1340). If no confirmation has been provided by the recipient, a determination is made at decision block 1330 as to whether the confirmation is overdue. For example, this may involve determining if the timer has reached a specified value signifying the passage of a specified period, or determining if the confirmation is past due in the calendar. If the confirmation is not yet past due, the wait step 1310 is implemented again, and a further check can subsequently be made as to whether the recipient has provided the confirmation at decision block 1320. If the confirmation is overdue, at decision block 1330, the sender is notified and/or the e-mail message is automatically re-sent (step 1350). Re-sending of messages was discussed further above in connection with FIG. 8. For example, the notification can be in the form of indicia in a folder view, as indicated in FIG. 7 or 8, for instance, or a separate e-mail notification. In one approach, a color coding scheme may be used so that sent messages which are overdue are displayed in a specific color. In another option, the degree to which a confirmation is overdue can be specified by the indicia. For instance, a sent message which is 1-7 days overdue can be displayed in yellow, while a sent message which is more than 7 days overdue can be displayed in red. The sender can then take appropriate action such as attempting to contact the recipient again with another e-mail or by other means.

FIG. 14 illustrates a user interface of a sender, showing a composed e-mail message for initiating a vote. In the present example, links are used for e-mail voting. For example, the links may have text identifying different candidates or other choices from which the user can choose. Consider an example in which a campus administrator sends an e-mail message to all of the enrolled students using a distribution list named "Student body". As with the other examples, the interface 1400 displays a header 1410 and a body 1420 of an e-mail message which is being composed. In the body 1420, the campus administrator types in text 1430 informing the students that they can cast a vote, such as for a student body president. This is an example only as many other voting scenarios can be used. For example, a user can poll his or her friends to determine a restaurant for meeting. A user could also initiate a "yes" or "no" vote on a desired subject (see FIG. 20). The interface 1400 includes a "voting" button 1405 that causes the voting setup screen 1500 of FIG. 15 to appear on the user's screen, in one possible implementation.

FIG. 15 illustrates a voting setup screen 1500 which is invoked from the user interface of FIG. 14. The screen 1500 can be provided using an appropriate application at the e-mail/web server and/or the sender's host machine, for instance. The voting setup screen 1500 can include a region 1510 that allows the user to enter the number of choices, such as candidates or other choices being voted on, and a region 1520 that allows the user to enter the names of the choices. In the present example, there are two choices, and the candidates names are "Betty Boop" and "Jim Thorpe". Various other interface designs can be provided as well. An "exit" button 1530 allows the user to exit the screen and return to the interface 1400, while a "continue" button 1540 allows the user to accept the entries and have corresponding links be inserted into the body 1420 of the e-mail message, as indicated by the interface 1600 of FIG. 16.

FIG. 16 illustrates a user interface 1600 of a sender, showing a composed e-mail message with links to vote choices inserted into the body of the e-mail message. In particular, a first link 1640 with plain text 1645 allows the recipient to select the first candidate, while a second link 1650 with plain text 1655 allows the recipient to select the second candidate. As mentioned earlier, only the hyperlink or the plain text need be displayed depending on the capabilities of the recipient's e-mail system. The links 1640 and 1645 which provide a vote for "Betty Boop" can be expressed by the following:

"Betty Boop"=http://www.hotmail/mail/votetally.aspx?action=bettyboop&data=<encrypted_string>.

In this example, "http" is the protocol, "www.hotmail.com" is the host e-mail/web server, "mail/votetally.aspx" is the resource path, and "?action=bettyboop&data=<encrypted_string>" is the query string, which denotes a vote for "Betty Boop". The second links 1650 and 1655 use a different query string: "?action=jimthorpe=<encrypted_string>", which denotes a vote for "Jim Thorpe".

When a link is selected, the corresponding URL and query string are sent in a communication from the recipient's e-mail client to the e-mail/web server. At the e-mail/web server, the query string is decrypted to recover the one or more identifiers associated with the e-mail message. This allows the e-mail/web server to identify the recipient, for instance, to ensure that each recipient only votes once. Additionally, a vote is tallied for the choice which is represented by the selected link. The accumulated votes can be reported to the user using an example interface 1700 such as shown in FIG. 17.

FIG. 17 illustrates a voting tally results screen 1700 in which a region 1710 reports the number of votes each choice has received. An "exit" button 1720 allows the user to exit the screen, while a "stop vote" button 1730 allows the user to end the vote so that no further votes will be counted.

Figure 18:
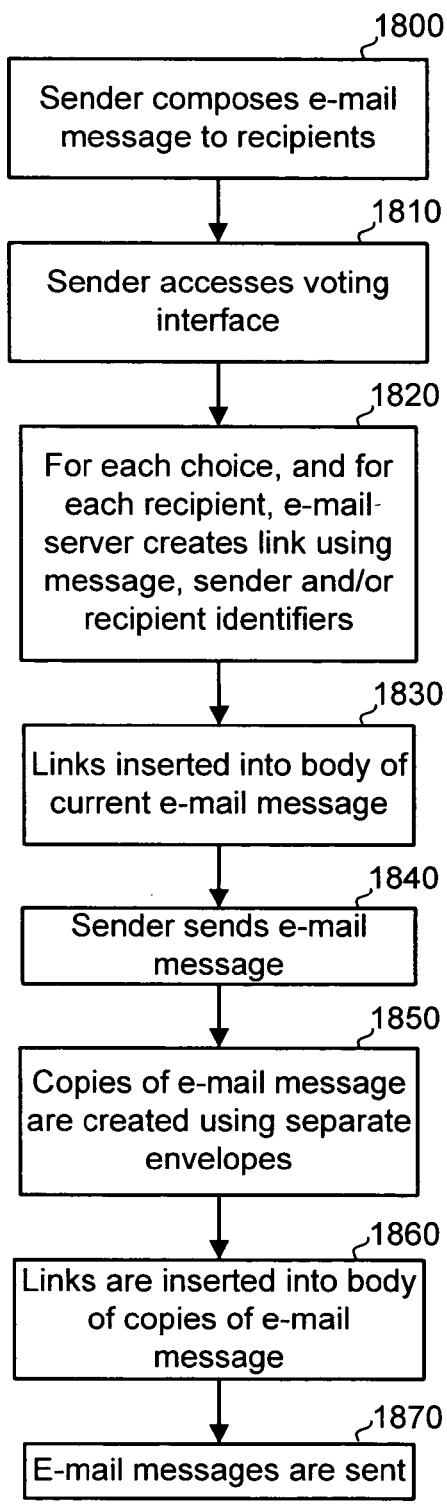
FIG. 18 illustrates a method for sending an e-mail message that enables voting.

FIG. 18 illustrates a method for sending an e-mail message that enables voting. At step 1800, the sender composes an e-mail message to the recipients, e.g., voters. Optionally, the e-mail message can be automatically generated. At step 1810, the sender accesses the voting interface 1500 of FIG. 15 to enter the relevant information regarding the choices to be voted on. At step 1820, for each choice, and for each recipient, the e-mail server creates a link using message, sender and/or recipient identifiers and, at step 1830, the links are inserted into the body of the current e-mail message. The remaining steps correspond to the analogous steps discussed in connection with FIG. 11.

Figure 19:
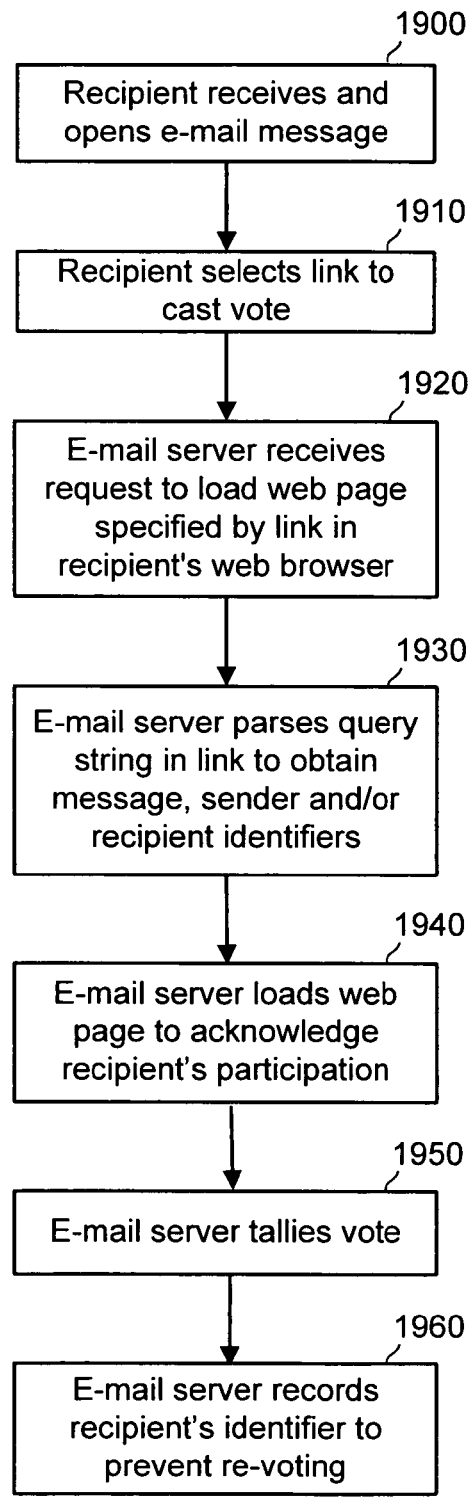
FIG. 19 illustrates a method for voting using a received e-mail message.

FIG. 19 illustrates a method for voting using a received e-mail message. At step 1900, the recipient receives and opens the e-mail message and, at step 1910, selects one of the links to cast a vote for the corresponding choice. Steps 1920-1940 correspond to the analogous steps discussed in connection with FIG. 12. At step 1950, the e-mail server tallies a vote for the choice represented by the selected link. Votes for the different choices by different recipients can thereby be tallied. At step 1960, the e-mail server records the recipient's identifier, which was obtained from the query string, to prevent re-voting by the recipient.

FIG. 20 illustrates an alternative user interface of a sender, showing a composed e-mail message for initiating a vote. In the present example, a yes or no vote is implemented for a sender who is organizing a school dance. The interface 2000 displays a header 2010 and a body 2020 of an e-mail message which is being composed. In the body 2020, the sender, Jeff, types in text 2030 informing the students that they can cast a yes or no vote to indicate whether they will attend a school dance. The interface 2000 includes a "voting" button 2005 that enables the sender to insert the voting links. In particular, a first link 2040 allows the recipient to select "yes", while a second link 2050 allows the recipient to "no". As mentioned earlier, only the hyperlink or the plain text need be displayed depending on the capabilities of the recipient's e-mail system. In the present example, only the hyperlinks are displayed. The "yes" link can have the plain text:

http://www.hotmail.com/mail/
votetally.aspx?action=yes=<encrypted_string> while the "no" link can have the plain text:

http://www.hotmail.com/mail/
votetally.aspx?action=no=<encrypted_string>.

In this example, it is desirable to know the identity of the recipients that selected the "yes" choice. For example, these recipients can be added to a list for use in planning the school dance. In one approach, a user interface can be provided to allow the sender to write an e-mail message, send an invitation, or add to a group in a contact list, the specific recipients among the multiple recipients who voted "yes". This allows the sender to quickly generate an invitation to the students who are interested.

The above approach can be implemented by sending separate copies of the e-mail message to the multiple recipients, where each copy includes a link having an identifier of the associated recipient. When the links are selected, the e-mail/web server obtains the recipient identifiers from the links and notes which recipients voted "yes". The e-mail/web server can then provide appropriate user interfaces or interact with the e-mail client to achieve the desired functionality.

Figure 21:
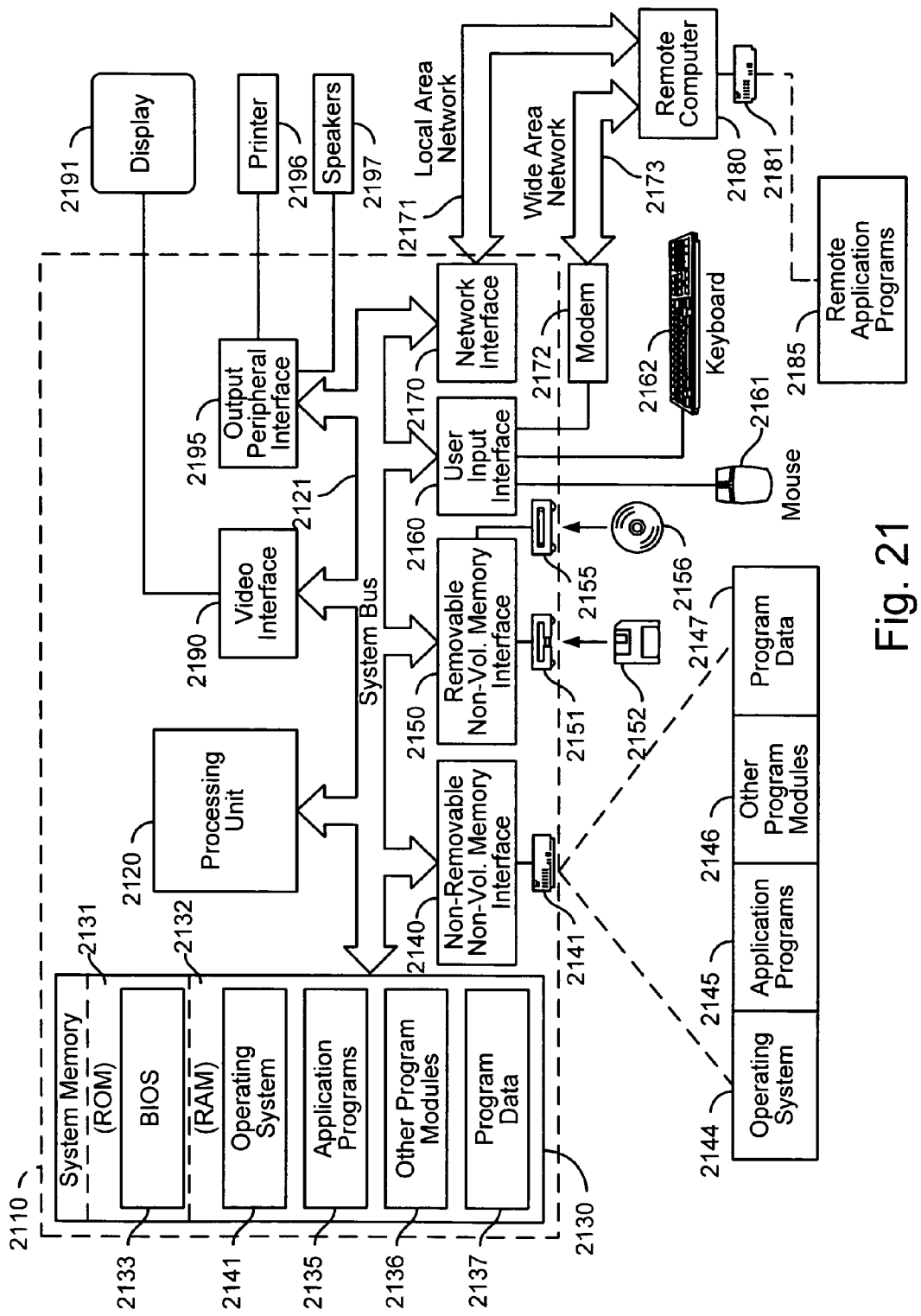
FIG. 21 is a block diagram of computer hardware suitable for implementing embodiments of the invention.

FIG. 21 is a block diagram of computer hardware suitable for implementing embodiments of the invention. An exemplary system for implementing the invention includes a general purpose computing device in the form of a computer 2110. Components of computer 2110 may include, but are not limited to, a processing unit 2120, a system memory 2130, and a system bus 2121 that couples various system components including the system memory to the processing unit 2120. The system bus 2121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2110 typically includes a variety of computer readable media. Computer readable media can be any available media that can be accessed by computer 2110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, which can be used to store the desired information and which can be accessed by computer 2110. Communication media typically embodies computer readable instructions, data structures, program modules or other data.

The system memory 2130 includes computer storage media in the form of volatile and/or nonvolatile memory such as read only memory (ROM) 2131 and random access memory (RAM) 2132. A basic input/output system 2133 (BIOS), containing the basic routines that help to transfer information between elements within computer 2110, such as during start-up, is typically stored in ROM 2131. RAM 2132 typically contains data and/or program modules that are immediately accessible to and/or presently being operated on by processing unit 2120. By way of example, and not limitation, FIG. 21 illustrates operating system 2134, application programs 2135, other program modules 2136, and program data 2137.

The computer 2110 may also include other removable/non-removable, volatile/nonvolatile computer storage media. By way of example only, FIG. 21 illustrates a hard disk drive 2141 that reads from or writes to non-removable, nonvolatile magnetic media, a magnetic disk drive 2151 that reads from or writes to a removable, nonvolatile magnetic disk 2152, and an optical disk drive 2155 that reads from or writes to a removable, nonvolatile optical disk 2156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2141 is typically connected to the system bus 2121 through a non-removable memory interface such as interface 2140, and magnetic disk drive 2151 and optical disk drive 2155 are typically connected to the system bus 2121 by a removable memory interface, such as interface 2150.

The drives and their associated computer storage media discussed above and illustrated in FIG. 21, provide storage of computer readable instructions, data structures, program modules and other data for the computer 2110. For example, hard disk drive 2141 is illustrated as storing operating system 2144, application programs 2145, other program modules 2146, and program data 2147. These components can either be the same as or different from operating system 2134, application programs 2135, other program modules 2136, and program data 2137. Operating system 2144, application programs 2145, other program modules 2146, and program data 2147 are given different numbers here to illustrate that, at a minimum, they are different copies. A user may enter commands and information into the computer 2110 through input devices such as a keyboard 2162 and pointing device 2161, commonly referred to as a mouse, trackball or touch pad. Other input devices (not shown) may include a microphone, joystick, game pad, satellite dish, scanner, or the like. These and other input devices are often connected to the processing unit 2120 through a user input interface 2160 that is coupled to the system bus, but may be connected by other interface and bus structures, such as a parallel port, game port or a universal serial bus (USB). A monitor 2191 or other type of display device is also connected to the system bus 2121 via an interface, such as a video interface 2190. In addition to the monitor, computers may also include other peripheral output devices such as speakers 2197 and printer 2196, which may be connected through an output peripheral interface 2195.

The computer 2110 may operate in a networked environment using logical connections to one or more remote computers, such as a remote computer 2180. The remote computer 2180 may be a personal computer, a server, a router, a network PC, a peer device or other common network node, and typically includes many or all of the elements described above relative to the computer 2110, although only a memory storage device 2181 has been illustrated. The logical connections depicted include a local area network (LAN) 2171 and a wide area network (WAN) 2173, but may also include other networks. Such networking environments are commonplace in offices, enterprise-wide computer networks, intranets and the Internet.

When used in a LAN networking environment, the computer 2110 is connected to the LAN 2171 through a network interface or adapter 2170. When used in a WAN networking environment, the computer 2110 typically includes a modem 2172 or other means for establishing communications over the WAN 2173, such as the Internet. The modem 2172, which may be internal or external, may be connected to the system bus 2121 via the user input interface 2160, or other appropriate mechanism. In a networked environment, program modules depicted relative to the computer 2110, or portions thereof, may be stored in the remote memory storage device.

By way of example, and not limitation, FIG. 21 illustrates remote application programs 2185 as residing on memory device 2181. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for confirming delivery of an e-mail message, comprising:

receiving at an e-mail server, a first e-mail message which includes, in a body of the first e-mail message, text which was composed by a sender of the first e-mail message on a user interface of the sender, the first e-mail message is received from a host computer of the sender, and is addressed to a recipient selected by the sender, where the sender and recipient are human users of an e-mail application;

delivering the first e-mail message from the server to an inbox of the recipient once the sender has finished composing the first e-mail message and sends the first e-mail message, the first e-mail message is delivered with the text which was composed by the sender, such that when the first e-mail message is opened by the recipient on a user interface of the recipient, the user interface of the recipient concurrently displays, in the body of the first e-mail message: (a) the composed text, (b) a link which includes at least one identifier, the link is selectable by the recipient to provide a confirmation e-mail message to an inbox of the sender indicating that the recipient received the first e-mail message, and (c) instructions for instructing the recipient to use the link to provide the confirmation e-mail message, wherein:

at the user interface of the sender, the link and the instructions are inserted into the body of the first e-mail message in response to a command made by the sender when composing the first e-mail message, so that the user interface of the sender concurrently displays, in the body of the first e-mail message: (d) the composed text, (e) the link, and (f) the instructions, such that the sender can view how the first e-mail message will appear to the recipient; and the delivering includes forwarding the first e-mail message as received from the sender with the link and the instructions inserted into the body of the first e-mail message;

when the recipient has not yet selected the link, displaying, on the user interface of the sender, an indicia for the first e-mail message in a folder view to indicate that the first e-mail message was previously sent, and that the sender is awaiting confirmation that the recipient has received the first e-mail message;

receiving a re-send command from the sender upon selection of a re-send indicia on the user interface of the sender; and in response to the re-send command, executing software which generates a new e-mail message by retrieving the first e-mail message from an e-mail store, copying the composed text from the first e-mail message to the new e-mail message, and providing the new e-mail message with identifiers of the sender and the recipient.

2. The computer-implemented method of claim 1, wherein: the instructions and the link are provided above the composed text in the body of the first e-mail message, when the first e-mail message is viewed by the recipient.

3. The computer-implemented method of claim 1, wherein:
the user interface of the sender displays the body of the first e-mail message with the composed text but without the link and the instructions before the sender enters the command; and
the user interface of the sender concurrently displays, in the body of the first e-mail message, the composed text, the link and the instructions, after the sender enters the command.

4. The computer-implemented method of claim 3, wherein:
the link includes default text which is editable by the sender to allow the sender to customize the link, while the user interface of the sender concurrently displays, in the body of the first e-mail message, the composed text, the link and the instructions.

5. The computer-implemented method of claim 1, further comprising:
when the recipient selects the link at the user interface of the recipient, loading a web page in a web browser of the user interface of the recipient to display a message acknowledging that the recipient has provided the confirmation e-mail message to the sender.

6. The computer-implemented method of claim 1, further comprising:
when the recipient has selected the link, displaying an indicia for the first e-mail message in the folder view on the user interface of the sender to indicate that delivery of the first e-mail message has been confirmed by the recipient, wherein the folder view is updated on an ongoing basis for tracking e-mail messages having delivery confirmation requests.

7. The computer-implemented method of claim 1, further comprising:
when the first e-mail message is opened by the recipient on the user interface of the recipient, the user interface of the recipient displays, in the body of the first e-mail message, concurrently with displaying the composed text, the link which includes at least one identifier, and the instructions for instructing the recipient to use the link to provide the confirmation e-mail message: (c) an additional link which is selectable to allow the recipient to provide a confirmation e-mail message to the inbox of the sender indicating that the recipient has read the first e-mail message, and (d) instructions for instructing the recipient to use the additional link to provide the confirmation e-mail message indicating that the recipient has read the first e-mail message.

8. The computer-implemented method of claim 1, wherein:
the at least one identifier comprises an e-mail address of the sender.

9. The computer-implemented method of claim 1, wherein the first e-mail message is addressed to multiple recipients including the recipient and a second recipient, the method further comprising:
providing a copy of the first e-mail message; and
inserting a second link in the copy of the first e-mail message, the second link including the second identifier and being selectable by the second recipient to provide a confirmation e-mail message to the inbox of the sender indicating that the second recipient received the copy of the first e-mail message.

10. The computer-implemented method of claim 1, further comprising:
in the folder view, notifying the sender when the confirmation is overdue, where the folder view is updated on an ongoing basis for tracking e-mail messages having delivery confirmation requests, where the folder view indicates a number of days the confirmation is overdue.

11. A non-transitory computer readable media having computer readable code embodied thereon for programming at least one processor to perform a method for voting or tallying via e-mail, the method comprising:
providing at least one identifier for a first e-mail message at a user interface of a sender, the at least one identifier including an identifier of a recipient of the first e-mail message, where the sender and recipient are human users of an e-mail application;
inserting a plurality of links in a body of the first e-mail message, each link including the at least one identifier and being selectable by the recipient to cast a vote for an associated choice, each link includes associated text which was entered by the sender via the user interface of the sender;
providing instructional text in the body of the first e-mail message to the recipient to cast a vote, the instructional text is typed in by the sender via the user interface of the sender;
wherein the user interface of the sender concurrently displays, in the body of the first e-mail message, each link and the associated text, and the instructional text, such that the sender can view how the first e-mail message will appear to the recipient;
delivering the first e-mail message with the plurality of links in the body to an inbox of the recipient once the sender has finished composing the first e-mail message and sends the first e-mail message by clicking on a send button on the user interface, wherein, the delivering includes forwarding the first e-mail message as received from the sender with each link and the associated text, and the instructional text, inserted into the body of the first e-mail message, to the recipient once the sender has finished composing the first e-mail message and sends the first e-mail message, such that when the first e-mail message is opened by the recipient on a user interface of the recipient, the user interface of the recipient concurrently displays, in the body of the first e-mail message, each link and the associated text, and the instructional text;
when the recipient has not yet selected at least one of the plurality of links, displaying, on the user interface of the sender, an indicia for the first e-mail message in a folder view to indicate that the first e-mail message was previously sent, and that the sender is awaiting confirmation that the recipient has received the first e-mail message;
receiving a re-send command from the sender upon selection of a re-send indicia on the user interface of the sender; and
in response to the re-send command, executing software which generates a new e-mail message by retrieving the first e-mail message from an e-mail store, copying the composed text from the first e-mail message to the new e-mail message, and providing the new e-mail message with identifiers of the sender and the recipient.

12. The non-transitory computer readable media of claim 11, wherein:

each link comprises a link to a web server; and the web server tallies a vote for an associated choice responsive to selection of one of the links by the recipient.

13. The non-transitory computer readable media of claim 11, wherein separate copies of the first e-mail message are sent to multiple recipients, each copy including a link having an identifier of the associated recipient, and the method performed further comprises:

identifying specific recipients among the multiple recipients who vote for a specified choice according to the identifiers.

14. A computer-implemented method for confirming delivery of an e-mail message, comprising:

receiving at an e-mail server, a first e-mail message which includes, in a body of the first e-mail message, text which was composed by a sender of the first e-mail message on a user interface of the sender, the first e-mail message is received from a host computer of the sender, and is addressed to a recipient selected by the sender, where the sender and recipient are human users of an e-mail application;

delivering the first e-mail message from the server to an inbox of the recipient once the sender has finished composing the first e-mail message and sends the first e-mail message, the first e-mail message is delivered with the text which was composed by the sender, such that when the first e-mail message is opened by the recipient on a user interface of the recipient, the user interface of the recipient displays, in the body of the first e-mail message: (a) the composed text, (b) a link which includes at least one identifier, the link is selectable by the recipient to provide a confirmation e-mail message to an inbox of the sender indicating that the recipient received the first e-mail message, and (c) instructions for instructing the recipient to use the link to provide the confirmation e-mail message;

when the recipient has not yet selected the link, displaying, on the user interface of the sender, an indicia for the first e-mail message in a folder view to indicate that the first e-mail message was previously sent, and that the sender is awaiting confirmation that the recipient has received the first e-mail message;

receiving a re-send command from the sender upon selection of a re-send indicia on the user interface of the sender; and in response to the re-send command, executing software which generates a new e-mail message by retrieving the first e-mail message from an e-mail store, copying the composed text from the first sent e-mail message to the new e-mail message, and providing the new e-mail message with identifiers of the sender and the recipient.

15. The computer-implemented method of claim 14, further comprising:

sending the new email message to the recipient.

16. The computer-implemented method of claim 14, wherein:

the generating the new e-mail message further includes retrieving identifiers of the sender and the recipient.

17. The computer-implemented method of claim 14, wherein:

the generating the new e-mail message further includes retrieving the instructions of the first e-mail message, and inserting the instructions into a body of the new e-mail message, along with a new link;

where the new link is selectable by the recipient to provide a confirmation e-mail message to the inbox of the sender indicating that the recipient received the new e-mail message.

18. The computer-implemented method of claim 14, further comprising:

displaying, on the user interface of the sender, an indicia for the new e-mail message in the folder view, where the indicia for the new e-mail message appears separately from the indicia for the first sent e-mail message.

* * * * *